United States Patent
Li et al.

(10) Patent No.: US 8,478,451 B2
(45) Date of Patent: Jul. 2, 2013

(54) METHOD AND APPARATUS FOR DYNAMICALLY ALLOCATING POWER IN A DATA CENTER

(75) Inventors: Congi Li, Shanghai (CN); Haoyu Hannibal Gao, Shanghai (CN); Rui Jian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 12/637,591

(22) Filed: Dec. 14, 2009

(65) Prior Publication Data

US 2011/0144818 A1    Jun. 16, 2011

(51) Int. Cl.
G05D 23/01        (2006.01)

(52) U.S. Cl.
USPC .................. 700/291; 713/300; 713/340

(58) Field of Classification Search
USPC ............... 700/295; 702/181; 713/300
See application file for complete search history.

(56) References Cited

U.S. PATENT DOCUMENTS

| | | | |
|---|---|---|---|
| 6,795,928 B2* | 9/2004 | Bradley et al. | 713/320 |
| 7,047,169 B2* | 5/2006 | Pelikan et al. | 703/2 |
| 7,085,692 B2* | 8/2006 | Jackson et al. | 703/2 |
| 7,634,741 B2* | 12/2009 | Klein | 715/811 |
| 7,702,931 B2* | 4/2010 | Goodrum et al. | 713/300 |
| 7,984,311 B2* | 7/2011 | Brumley et al. | 713/300 |
| 8,086,887 B2* | 12/2011 | Akimoto | 713/340 |
| 2007/0067656 A1* | 3/2007 | Ranganathan et al. | 713/320 |
| 2009/0070611 A1* | 3/2009 | Bower et al. | 713/322 |
| 2009/0287823 A1* | 11/2009 | Bose et al. | 709/226 |

FOREIGN PATENT DOCUMENTS

| | | |
|---|---|---|
| CN | 101567707 | 10/2009 |
| JP | H11178247 | 7/1999 |
| JP | 2003140782 | 5/2003 |
| JP | 2007215354 | 8/2007 |
| JP | 200970328 | 2/2009 |

OTHER PUBLICATIONS

X. Wang, M. Chen, C. Lefurgy, and T.W. Keller, "SHIP: Scalable hierarchical power control for large-scale data centers," in Proceedings of the 18th International Conference on Parallel Architectures and Compilation Techniques (PACT), 2009.*

J Choi, S. Govindan, B. Urgaonkar, and A. Sivasubramaniam. "Profiling, prediction, and capping of power consumption in consolidated environments." IEEE Computer Society, 2008.*

(Continued)

*Primary Examiner* — Kavita Padmanabhan
*Assistant Examiner* — Michael Scapin
(74) *Attorney, Agent, or Firm* — Blakely, Sokoloff, Taylor & Zafman LLP

(57) ABSTRACT

Embodiments of the invention relate generally to the field of power management of computer systems, and more particularly to a method and apparatus for dynamically allocating power to servers in a server rack. The method comprises: measuring power consumption of a computer system having one or more servers; estimating probability distribution of power demand for each of the one or more servers, the estimation based on the measured power consumption; estimating performance loss via the estimated probability distribution; computing power capping limits for each of the one or more servers, the computation based on the estimated probability distribution and the performance loss; and dynamically allocating the power capping limits to each of the one or more servers by modifying previous power capping limits of each of the one or more servers.

30 Claims, 5 Drawing Sheets

OTHER PUBLICATIONS

José M. Peña, Victor Robles, Óscar Marbán, María S. Pérez, "Bayesian Methods to Estimate Future Load in Web Farms", Advances in Web Intelligence Lecture Notes in Computer Science, vol. 3034, 2004, pp. 217-226.*

Fan, Xiaobo, et al., "Power Provisioning for a Warehouse-sized Computer", ISCA'07, Jun. 9-13, 2007, San Diego, California, USA. Copyright 2007 ACM, (Jun. 9, 2007), pp. 13-23.

INTEL, "Intel Software Network", Intel (2008). Intel Dynamic Power Datacenter Manager. http://software.intel.com/en-us/articles/intel-dynamic-power-datacenter-manager/. Last viewed Dec. 11, 2009., (2008), pp. 1-2.

Ranganathan, P., et al., "Ensemble-level Power Management for Dense Blade Servers", Computer Architecture, 2006. ISCA '06. 33rd International Symposium, (2006), p. 66-77.

Notice of Reasons for Rejection mailed Feb. 14, 2012 for Japanese Patent Application No. 2010-234645.

First Office Action issued for Chinese Patent Application No. 201010604214.1, mailed Feb. 6, 2013, 20 pages.

* cited by examiner

|  | Performance Loss | Relative Reduction in Loss |
|---|---|---|
| Static power allocator | 0.822% | - |
| Dynamic Power Allocator | 0.322% | 60.8% |

Fig. 3

METHOD AND APPARATUS FOR DYNAMICALLY ALLOCATING POWER IN A DATA CENTER

FIELD OF THE INVENTION

Embodiments of the invention relate generally to the field of power management of computer systems, and more particularly to a method and apparatus for dynamically allocating power capping limits to servers in a server rack.

BACKGROUND

A server rack is designed for a particular power consumption envelope that depends on factors such as, number of servers in the server rack, type of servers in the server rack (e.g., servers with low power CPU(s) or high power CPU(s)), cooling system of the room housing the server rack, power supply distribution network in the server rack for the servers, etc. Servers in a computer system, such as a server rack, execute a number of applications and may have a diverse workload. Diverse workload means that a server in a computer system may not consume the same amount of power as another server, at a given time, in the same rack because of different workloads that require different processor utilization. A fully utilized processor in a server means that no processing cycles of the processors are wasted.

However, servers may not be fully utilized because of the power limit placed on the servers by the total power capacity of the server rack. Such underutilized servers caused by power limiting in the server rack may exhibit performance loss. Performance loss is defined as processor utilization that would have occurred had the processor been allowed to process without any power consumption limit. The power limit placed on the servers may also result from an internal power limit set for the server by the server itself. For example, a power controller unit in the server may set the server power capacity to a conservative limit based on processor reliability and longevity benchmarks. If the processor (or the server housing the processor) tends to consume power above the conservative limit (generally monitored via thermal sensors in, on, or around the processor), then the processor throttles. Throttling means that the processor operating frequency and/or power supply level is reduced to lower the power consumed as well as the heat generated by the processor.

One way to increase the computational capabilities of the servers and to also reduce performance loss of the servers in the server rack is to provide better temperature cooling facilities to the server rack combined with raising the power limit set by the power controller unit of each server. However, such a method for reducing performance loss does not take into account the power consumption of individual servers based on their workload. Such a method also requires physical infrastructure changes such as better temperature cooling facilities and redesign of power distribution network in the servers within the server rack. Furthermore, heuristic approaches that determine power budgets for individual servers in a server rack use an ad-hoc power assignment methodology that do not take into account the foreseeable power demand of servers in view of their performance loss.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 3 is a table showing the relative reduction in performance loss via the dynamic power allocator, according to one embodiment of the invention.

DETAILED DESCRIPTION

Embodiments of the invention relate to a method and apparatus for dynamically allocating power capping limits to servers in a server rack. In one embodiment, actual power consumption of each server in the server rack is monitored at regular intervals and a power demand is estimated based on computing a probability distribution of the power demand and estimated performance loss of each server in the server rack. In one embodiment, new power capping limits for each server in the server rack is estimated iteratively and dynamically allocated to the server to achieve reduction in the server performance loss.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Figure 1:
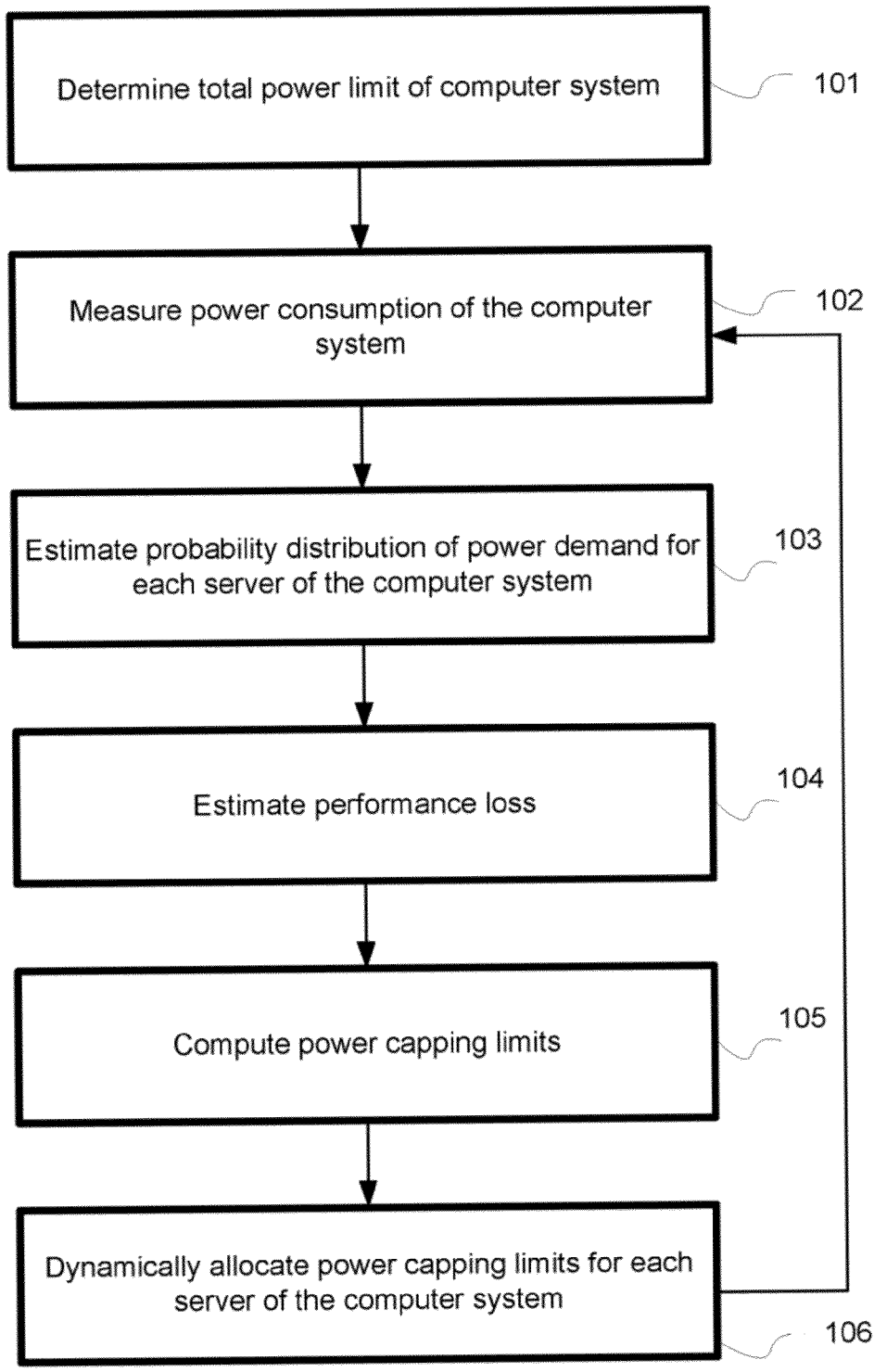
FIG. 1 is a flow chart for computing power capping limits by computing probability distribution of power demand, according to one embodiment of the invention.

FIG. 1 illustrates a flow chart 100 for computing power capping limits by computing a probability distribution of power demand of servers in a computer system, according to one embodiment of the invention. At block 101 a total power limit of the computer system is determined. In one embodiment, the computer system is a server rack having one or more servers stored in the rack. In one embodiment, the total power limit of the computer system is based on the total power capacity of the computer system for a particular power distribution network and the temperature cooling system for the computer system.

At block 102, power consumption of the computer system is measured. In one embodiment, the measuring is performed via a power controller in each server. In one embodiment, the power controller provides the current power consumption of the server based on the amount of current provided to the processor (or multiple processors) in the server at a given power supply voltage level. The power controller, in one embodiment, also communicates new power capping limits to the processor (or multiple processors) in the server. In one embodiment, the power controller on the server reads the power consumption directly from power supply unit of the server, and then throttles the CPU(s) with a feedback control loop if a power consumption and/or temperature threshold is crossed. In such an embodiment, the power controller does not require knowledge of the power consumption of the CPU(s) for monitoring and controlling the power consumption of the server.

In one embodiment, the measured power consumption of every server ($\rho_1^{(t)}, \ldots, \rho_n^{(t)}$) in the computer system and the determined power limit of the computer system are provided to the dynamic power allocator. In one embodiment, the dynamic power allocator is situated at a remote location and is configured to compute, based on computing a probability distribution of power demand and estimated performance loss for each server, a power capping limit for each server.

At block 103, the probability distribution of power demand for all servers (one or more) is estimated. The probability distribution models the behavior of power demand of each server in the computer system at every time step t. In one embodiment, the time step t is configurable by a user or another computing machine. In one embodiment, the time step t is 30 seconds. In one embodiment, the power demand of a server is the power consumption that sustains the server workload without power capping.

The mathematical expressions discussed herein are for illustration purposes. Embodiments of the invention are not limited to these mathematical expressions.

At block 104, performance loss of each server in the computer system is estimated. Performance loss is defined as processor utilization that would have occurred had the processor been allowed to process without any power capping limit. In one embodiment, performance loss of a server configured to operate under a power capping limit is positively correlated with a gap between the power demand and the power capping limit. The power capping limit of a server is the upper limit for power consumption of a server—server processor(s) is/are throttled near or at the power capping limit. In one embodiment, the instant at which a server is throttled (including the CPU(s) in the server) is the power capping limit of the server.

In one embodiment, the probability distribution of power demand for all servers in a computer system at time step t is expressed as:

$$P(D_i^{(t)} = d_i^{(t)})$$

where $D_i^{(t)}$ denotes the random variable of the power demand at time step t, where $d_i^{(t)}$ denotes the values of the random variable of the power demand, and where 'i' ranges from 1 to n number of servers in a computer system.

In one embodiment, performance loss of each server in the computer system is computed via an expectation of gaps (differences) between the power demand ($D_i^{(t)}$) and the power capping limit ($c_i^{(t)}$) of each server with respect to the probability distribution $P(D_i^{(t)} = d_i^{(t)})$. In one embodiment, the gap between the power demand ($D_i^{(t)}$) and the power capping limit ($c_i^{(t)}$) of each server is expressed as:

$$D_i^{(t)} - c_i^{(t)} \text{ for } d_i^{(t)} > c_i^{(t)} \ (i=1, \ldots, n)$$

In one embodiment, a demand bigram model and a power capping model is used to model the performance loss of a server in the computer system. A demand bigram model, in one embodiment, can be expressed as $P(d_i^{(t)} | d_i^{(t-1)})$. For the sake of not obscuring the embodiments of the invention, it is assumed that the power demand of a server in the current time step t is highly correlated with the power demand in the previous time step t−1. Such high correlation at various time steps results in a first-order Markov chain. In other embodiments, the power demand of a server in the current time step t depends on more information other than the power demand in the previous time step t−1. For example, in one embodiment, more information includes power demand values of several previous time steps to predict whether there would be a rise in power demand in the next time step. In such an embodiment higher order Markov chains may be needed to estimate performance loss of a server.

In one embodiment, the demand bigram model assigns a higher probability (i.e., higher than the mean value) in estimating the performance loss of a server (discussed later) if the current time step power demand $d_i^{(t)}$ is close in value to the previous time step power demand $d_i^{(t-1)}$. In one embodiment, if the current time step power demand $d_i^{(t)}$ is not close in value to the previous time step power demand $d_i^{(t-1)}$ then a lower probability (i.e., lower than the mean value) is assigned by the demand bigram model in estimating the performance loss (discussed later) of the server. In one embodiment, the probability distribution of the power demand is expressed as a Gaussian distribution with mean as $d_i^{(t-1)}$.

In one embodiment, if the power demand of a server is lower than the power capping limit of the server, then the resulting power consumption of the server will be proximate in value to the value of the power demand. In one embodiment, if the power demand of a server is higher than the power capping limit of the server, then the resulting power consumption of the server is proximate to the value of the power capping limit of the server.

Based on the above two embodiments, the probability distribution of power consumption of a server can be expressed by the following probability model:

$$P(\rho_i^{(t)} | d_i^{(t)}, c_i^{(t)})$$

In one embodiment, power capping model is used for estimating performance loss of a server. An example of a power capping model can be mathematically expressed as:

$$\text{If } d < c - \delta, P(\rho | d, c) = \begin{cases} 1, & \rho = d \\ 0, & \rho \neq d \end{cases}$$

$$\text{If } d \geq c - \delta, P(\rho | d, c) = \begin{cases} \dfrac{1}{2\delta + 1}, & \rho \geq d - \delta \text{ and } \rho \leq d + \delta \\ 0, & \rho < d - \delta \text{ or } \rho > d + \delta \end{cases}$$

$$\text{If } d > c, P(\rho | d, c) = \begin{cases} (1-\beta)\dfrac{1}{2\delta + 1}, & \rho \geq c - \delta \text{ and } \rho \leq c + \delta \\ 0, & \rho < c - \delta \\ \beta\dfrac{1}{c_{max} - c - \delta}, & \rho > c + \delta \end{cases}$$

where d is the power demand of a server, c is the power capping limit of the server, ρ is the probability distribution of the server power demand, δ is a small number (e.g., 0.1) to characterize possible fluctuation in the power capping limit of the server, δ is a smoothing parameter having a small value (e.g., 0.1) to characterize possible effects of failure in capping the power consumption of the server, and where $C_{max}$ is the maximum allowed value of c. The above expressions illustrate that if the power demand of the server is far below the power capping limit of the server then the power consumption of the server will equal to the power demand of the server, and if the power demand of the serve is close to or larger than the power capping limit of the server then the power consumption of the server will fluctuate around the power capping limit of the server.

In one embodiment, a Bayesian Theorem is applied to estimate/compute the probability distribution of the power demand and/or to estimate the performance loss of a server. In one embodiment, the Bayesian Theorem uses the demand bigram model and the power capping model along with the power consumption history of the server at every time step to compute the probability distribution of the power demand of the server.

In one embodiment, an iterative method is used for estimating the probability distribution of the power demand of the server in view of performance loss of the server. Such an iterative method, in one embodiment, can be mathematically expressed as:

$$h_i^{(t)} = (\rho_i^{(t-1)}, c_i^{(t-1)}, h_i^{(t-1)})$$

$$\hat{P}(d_i^{(t-1)} \mid h_i^{(t)}) = \hat{P}(d_i^{(t-1)} \mid \rho_i^{(t-1)}, c_i^{(t-1)}, h_i^{(t-1)})$$

$$= \frac{P(\rho_i^{(t-1)} \mid d_i^{(t-1)}, c_i^{(t-1)})\hat{P}(d_i^{(t-1)} \mid h_i^{(t-1)})}{\sum_d P(\rho_i^{(t-1)} \mid d, c_i^{(t-1)})\hat{P}(d \mid h_i^{(t-1)})}$$

$$\hat{P}(d_i^{(t)} \mid h_i^{(t)}) = \sum_{d_i^{(t-1)}} P(d_i^{(t)} \mid d_i^{(t-1)})\hat{P}(d_i^{(t-1)} \mid \rho_i^{(t-1)}, c_i^{(t-1)}, h_i^{(t-1)})$$

$$= \sum_{d_i^{(t-1)}} P(d_i^{(t)} \mid d_i^{(t-1)}) \frac{P(\rho_i^{(t-1)} \mid d_i^{(t-1)}, c_i^{(t-1)})\hat{P}(d_i^{(t-1)} \mid h_i^{(t-1)})}{\sum_d P(\rho_i^{(t-1)} \mid d, c_i^{(t-1)})\hat{P}(d \mid h_i^{(t-1)})}$$

where $h_i^{(t)}$ represents the current history of a server i at time step t computed recursively via the previous measured power consumption of the server $\rho_i^{(t-1)}$, the previous capping limit $c_i^{(t-1)}$ of the server, and the previous history $h_i^{(t-1)}$, where $\hat{P}(d_i^{(t-1)}|h_i^{(t-1)})$ is the power demand estimation computed during the previous time step (t-1) by determining/computing a probability distribution of the power demand of the server and a previous server history i.e., the power demand of the server estimated from the Bayesian Theorem, and where $\hat{P}(d_i^{(t)}|h_i^{(t)})$ is the estimated power demand of the server which is then used for solving the power capping limits of the servers via a hill-climbing method discussed later. In one embodiment, the previous power consumption $\rho_i^{(t-1)}$ of the server represents the power consumption of the server when the processor(s) of the server executes a throttle. In one embodiment, a processor throttles when the power demand of the server housing the processor exceeds the power capping limit.

Referring back to FIG. 1, at block 105 power capping limits are computed for each server of the computer system, such as a server rack. In one embodiment, the power capping limits are computed by solving an optimization model based on the estimated/computed probability distribution of the power demand. The optimization model, in one embodiment, is mathematically expressed as:

$$\Delta Loss_i^{(t)}(c_i^{(t)}) = Loss_i^{(t)}(c_i^{(t)}) - Loss_i^{(t)}(c_i^{(t)} + 1) = \sum_{d_i^{(t)}=c_i^{(t)}+1}^{c_{i,max}} P(D_i^{(t)} = d_i^{(t)})$$

where $Loss_i^{(t)}$ represents performance loss of a server i at time t.

In one embodiment, a hill-climbing method is implemented on a processor for solving the optimization model. The hill-climbing method stops solving the optimization model once an optimum solution with respect to the constraints is reached. In one embodiment, the constraints include a group of servers in the form of a tree hierarchy. The tree hierarchy, in one embodiment, includes data centers with rows of racks and rooms to store the racks. In one embodiment, the time complexity of the hill-climbing method is big O(n log(n)). The hill-climbing method, in one embodiment, is implemented for execution on a processor with the following pseudo-code.

Initialize $c_i^{(t)} \leftarrow c_{i,min}$, $i = 1, \ldots, n$

Loop $I \leftarrow \varnothing$

For each server $i$, if increasing $c_i^{(t)}$ does not violate any constraint, then $I \leftarrow I \cup \{i\}$ If $I = \varnothing$, return $c^{(t)} = (c_1^{(t)}, \ldots, c_n^{(t)})$ $i^* \leftarrow \underset{i}{\operatorname{argmax}} \sum_{d_i^{(t)}=c_i^{(t)}+1}^{c_{i,max}} \hat{P}(d_i^{(t)} \mid h_i^{(t)})$ $c_{i^*}^{(t)} \leftarrow c_{i^*}^{(t)} + 1$ End Loop At block 106, the computed power capping limits $c_{i^*}^{(t)}$ are dynamically allocated to each server of the computer system. In one embodiment, power controller(s) of each server (see FIG. 5) dynamically allocate and/or enforce the new power capping limits for each server in the computer system. In one embodiment, the sum of the dynamically allocated power capping limits for each server in the computer system is not more than the total power limit of the computer system determined at block 101.

Figure 2A:
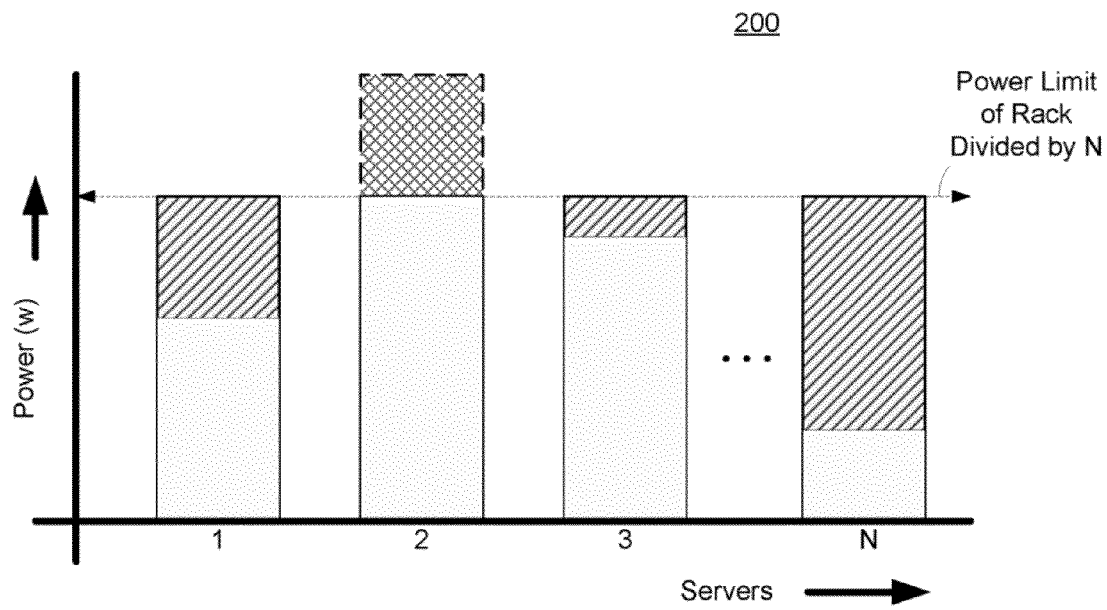
FIG. 2A is a box graph showing power demand for servers in a server rack before applying the dynamically allocated power capping limits from the dynamic allocator to the servers.

FIG. 2A is a box graph 200 illustrating power demand for servers in a server rack before applying the dynamically allocated power capping limits to the servers, according to one embodiment of the invention. The x-axis represents servers (1, ... N) while the y-axis represents power consumption in Watts. Each box represents power consumption with respect to a power limit of the server rack. This power limit in FIG. 2A is shown by the dashed line which is the total power limit divided by N. The shaded region of the box below the dashed power limit line is the unused power for a particular server. The unused power region represents an underutilized server given its workload at time t. This means that such a server can take on more work than its current workload. Servers 1, 3, and N are all examples of underutilized servers. Server 2, however, is fully utilized and suffers from a performance loss. The shaded region above the dashed power limit line represents performance loss—power the server would have consumed executing an application had there been no power capping limit.

Figure 2B:
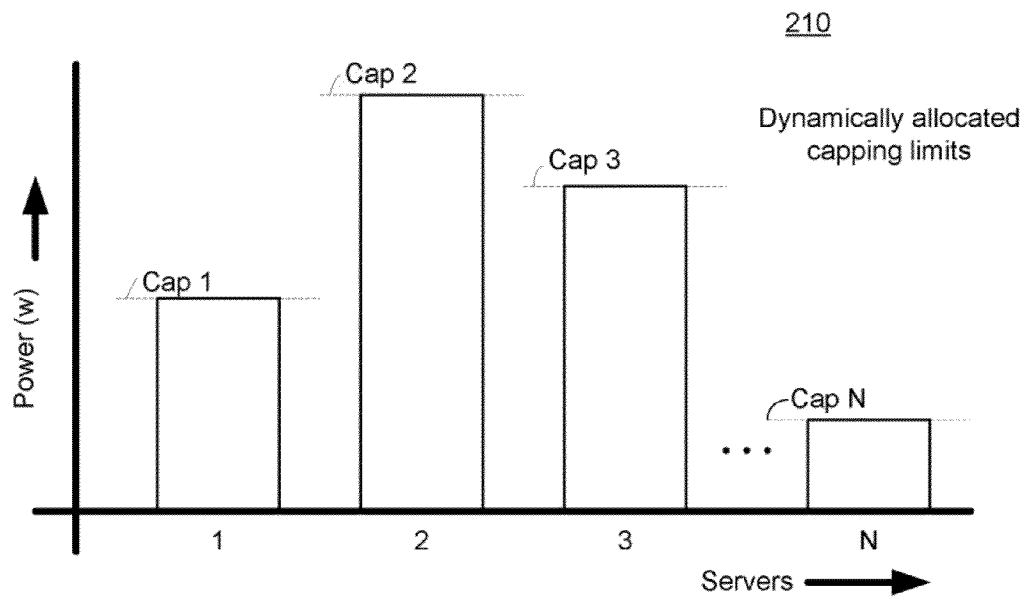
FIG. 2B is a box graph showing power demand for servers in a server rack after applying the dynamically allocated power capping limits from the dynamic allocator to the servers, according to one embodiment of the invention.

FIG. 2B is a box graph 210 illustrating power demand for servers in a server rack after applying the dynamically allocated power capping limits to the servers, according to one embodiment of the invention. The x-axis represents servers (1, . . . N) while the y-axis represents power consumption in Watts. In this example, the dynamic power allocator, that performs the method discussed in reference to FIG. 1, dynamically allocates new power capping limits for each server in the rack according to its power demand. Based on the power demand of the servers in FIG. 2A, the new power capping limits are dynamically allocated for the servers as shown in FIG. 2B. Performance loss is reduced (in this example to zero as compared to server 2 in FIG. 2A) for server 2 by allocating a higher power capping limit while lowering the power capping limits for servers 1, 3, and N.

FIG. 3 is a table illustrating the relative reduction in performance loss via the dynamic power allocator, according to one embodiment of the invention. In this example, two power management systems are compared. The first system is a static system in which each server in the rack is provided a fixed power capping limit regardless of the workloads of the server. The second power management system is the dynamic power allocator described in various embodiments herein. The first system is used as a base reference for the dynamic power allocator. In this embodiment, a diverse set of workloads is provided to a rack (computer system) of servers and performance loss for each server in the rack is computed.

In this embodiment, the performance loss of the second system based on the dynamic allocator is 60.8% reduced as compared to the performance loss of the first system based on the static power allocator. The relatively lower performance loss with the dynamic allocator is because the dynamic allocator is able to compute and allocate custom power capping limits regularly for each server based on the diverse workload of each server.

Figure 4:
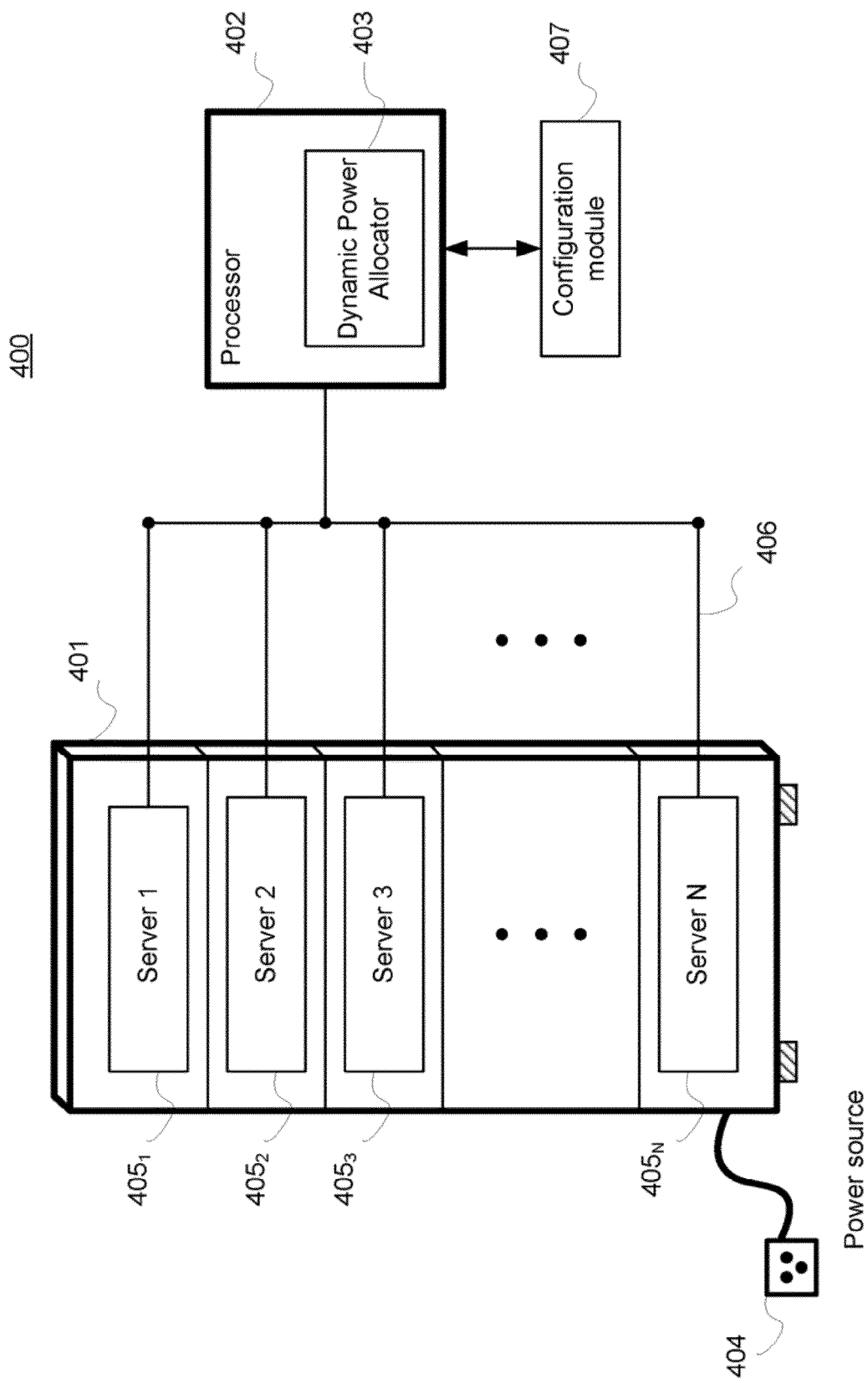
FIG. 4 illustrates an apparatus having a server rack coupled with a dynamic power allocator, according to one embodiment of the invention.

FIG. 4 illustrates an apparatus 400 having a server rack 401 coupled with the dynamic power allocator 403, according to one embodiment of the invention. In one embodiment, the server rack 401 includes one or more servers $405_{1-N}$. The server rack, in one embodiment, has a power consumption limit based on the power supply 404, temperature cooling system (not shown), and number of servers $405_{1-N}$. In one embodiment, the dynamic power allocator 403 is executed by a processor 402. In one embodiment, the processor 402 is coupled with the server rack 403 via a communication network 406.

The dynamic power allocator 403, in one embodiment, computes power capping limits for each of the servers $405_{1-N}$ at every time step as illustrated by the flowchart of FIG. 1. The time step t is configurable by a user or a machine (hardware and/or software) as shown by 407.

Figure 5:
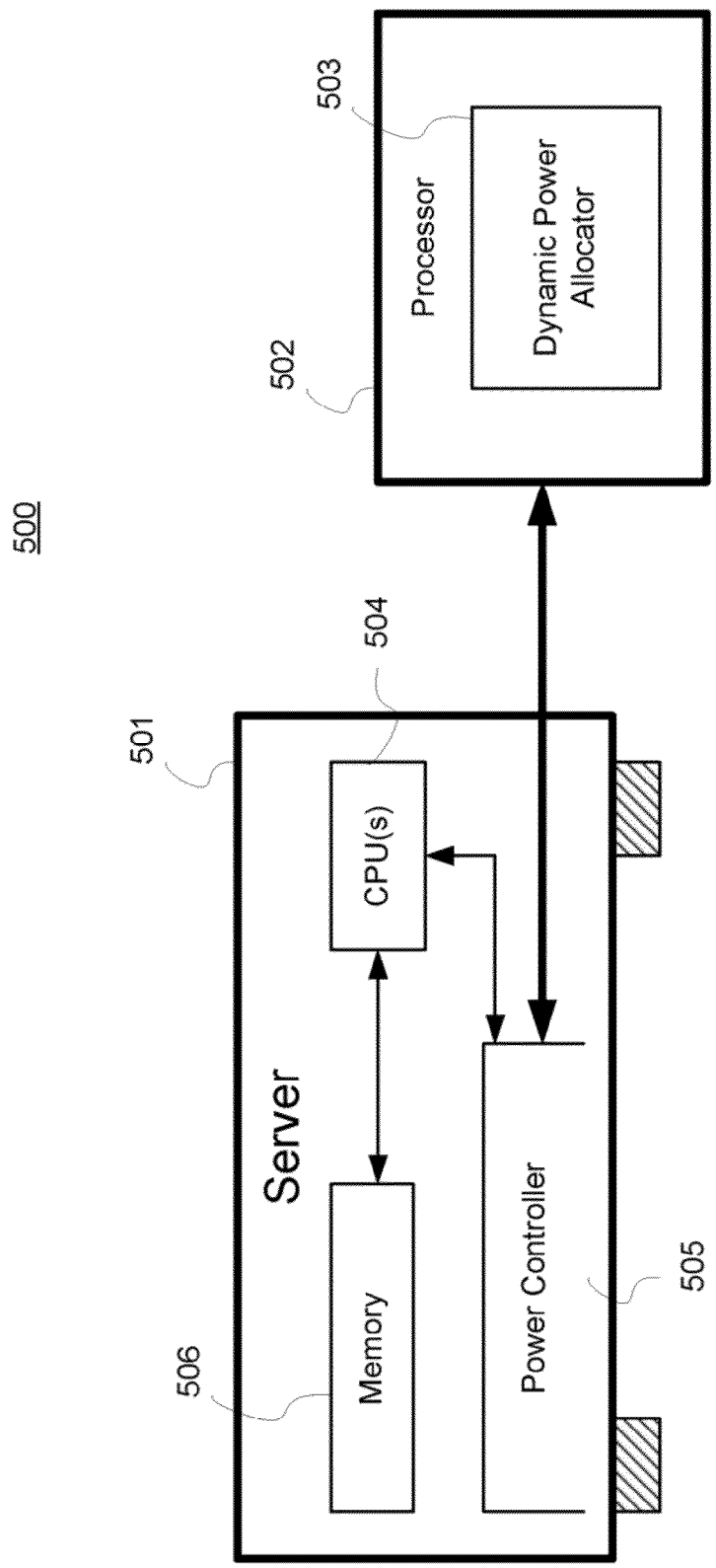
FIG. 5 illustrates an apparatus for dynamically allocating power capping limit to a server, according to one embodiment of the invention.

FIG. 5 illustrates an apparatus 500 for dynamically allocating power capping limit to a server 501, according to one embodiment of the invention. In one embodiment, the server 501 is coupled with a processor 502 having instructions and logic 503 to execute the dynamic power allocation flowchart of FIG. 1. The server 501, in one embodiment, includes CPU(s) 504 coupled with a power controller 505 and memory 506. In one embodiment, the power capping limit for the server is set by the power controller 505. The power controller 505, in one embodiment, provides the dynamic power allocator 503 with measured power consumption of the server 501. In one embodiment, once the dynamic power allocator 503 computes the new power capping limits for the server, it communicates those new power capping limits to the power controller 501. The server 501 then operates under the new dynamically allocated power capping limits that provide reduced performance loss and more computational capability.

Elements of embodiments are also provided as a machine-readable medium (also referred to as computer readable medium) for storing the computer-executable instructions (e.g., the dynamic power allocator of FIG. 1). The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

While the invention has been described in conjunction with specific embodiments thereof, many alternatives, modifications and variations will be apparent to those of ordinary skill in the art in light of the foregoing description.

For example, in one embodiment, after the probability distribution of power demand is estimated/computed, an exhaustive search in the space of $c^{(t)}=(c_1^{(t)}, \ldots, c_n^{(t)})$ may be used to solve the optimization model to determine optimal power capping limits for the servers in the server rack. Embodiments of the invention are intended to embrace all such alternatives, modifications, and variations as to fall within the broad scope of the appended claims.

We claim:

1. A method comprising:
measuring power consumption of a computer system having one or more servers;
estimating probability distribution of power demand for each of the one or more servers, the estimation based on the measured power consumption;
estimating performance loss via the estimated probability distribution;
computing power capping limits for each of the one or more servers, the computation based on the estimated probability distribution and the performance loss, wherein the power capping limits indicate power consumption limits of the one or more servers; and
dynamically allocating the power capping limits to each of the one or more servers by modifying previous power capping limits of each of the one or more servers,
wherein computing power capping limits is based on a difference between a first performing loss of a first power capping limit and a second performing loss of a second power capping limit, the second power capping limit is set by increasing the first capping limit by a power unit.

2. The method of claim 1, further comprising:
determining a total power limit of the computer system, wherein a sum of the dynamically allocated power capping limits for each of the one or more servers is not more than the total power limit.

3. The method of claim 1, wherein the probability distribution of the power demand is estimated based on a Bayesian Theorem.

4. The method claim 3, wherein the performance loss is estimated based on the Bayesian Theorem.

5. The method of claim 4, wherein the Bayesian Theorem is based on a demand bigram model and a power capping model.

6. The method of claim 1, wherein the estimated performance loss is based on:

a previous power demand of each of the one or more servers; and power consumption of each of the one or more servers when any of the servers executes a throttle.

7. The method of claim 6, wherein the throttle is executed when the power demand of any of the one or more servers exceeds a predetermined power level threshold.

8. The method of claim 7, wherein the predetermined power level threshold is configurable.

9. The method of claim 1, wherein computing the power capping limits is based on a hill-climbing method.

10. The method of claim 1, wherein measuring the power consumption is performed by a power controller of each of the one or more servers.

11. The method of claim 1, wherein modifying the previous power capping limits of each of the one or more servers is performed via power controller units of the servers.

12. The method of claim 1, wherein the measuring, the estimating of the probability distribution and performance loss, the computing, and the dynamically allocating is performed on occurrence of a configurable time step.

13. A non-transitory computer-readable storage medium having computer executable instructions stored thereon, the instructions when executed cause a computer to perform a method, the method comprising:
measuring power consumption of a computer system having one or more servers;
estimating probability distribution of power demand for each of the one or more servers, the estimation based on the measured power consumption;
estimating performance loss via the estimated probability distribution;
computing power capping limits for each of the one or more servers, the computation based on the estimated probability distribution and the performance loss, wherein the power capping limits indicate power consumption limits of the one or more servers; and
dynamically allocating the power capping limits to each of the one or more servers,
wherein computing power capping limits is based on a difference between a first performing loss of a first power capping limit and a second performing loss of a second power capping limit, the second power capping limit is set by increasing the first capping limit by a power unit.

14. The non-transitory computer-readable storage medium of claim 13 having further computer executable instructions stored thereon, the further computer executable instructions when executed cause the computer to perform a further method comprising:
determining a total power limit of the computer system, wherein a sum of the dynamically allocated power capping limits for each of the one or more servers is not more than the total power limit.

15. The non-transitory computer-readable storage medium of claim 13, wherein the probability distribution of the power demand is estimated based on a Bayesian Theorem.

16. The non-transitory computer-readable storage medium of claim 15, wherein the performance loss is estimated based on the Bayesian Theorem.

17. The non-transitory computer-readable storage medium of claim 16, wherein the Bayesian Theorem is based on a demand bigram model and a power capping model.

18. The non-transitory computer-readable storage medium of claim 13, wherein the estimated performance loss is based on:

a previous power demand of each of the one or more servers; and power consumption of each of the one or more servers when any of the servers executes a throttle.

19. The non-transitory computer-readable storage medium of claim 18, wherein the throttle is executed when the power demand of any of the one or more servers exceeds a predetermined power level threshold.

20. The non-transitory computer-readable storage medium of claim 19, wherein the predetermined power level threshold is configurable.

21. The non-transitory computer-readable storage medium of claim 13, wherein computing the power capping limits is based on a hill-climbing method.

22. The non-transitory computer-readable storage medium of claim 13, wherein measuring the power consumption is performed by a power controller of each of the one or more servers.

23. The non-transitory computer-readable storage medium of claim 13, wherein dynamically allocating the power capping limits to each of the one or more servers comprises:
modifying previous power capping limits of each of the one or more servers via power controller units of the servers.

24. The non-transitory computer-readable storage medium of claim 13, wherein the measuring, the estimating of the probability distribution and performance loss, the computing, and the dynamically allocating is performed on occurrence of a configurable time step.

25. An apparatus comprising:
a server rack having one or more servers;
a processor coupled with the server rack via a network interface, the processor having logic to perform a method comprising:
measuring power consumption of the server rack;
estimating probability distribution of power demand for each of the one or more servers, the estimation based on the measured power consumption;
estimating performance loss via the estimated probability distribution;
computing power capping limits for each of the one or more servers, the computation based on the estimated probability distribution and the performance loss, wherein the power capping limits indicate power consumption limits of the one or more servers; and
dynamically allocating the power capping limits to each of the one or more servers of the server rack,
wherein computing power capping limits is based on a difference between a first performing loss of a first power capping limit and a second performing loss of a second power capping limit, the second power capping limit is set by increasing the first capping limit by a power unit.

26. The apparatus of claim 25, wherein the logic of the processor to further perform a method comprising:
determining a total power limit of the computer system, wherein a sum of the dynamically allocated power capping limits for each of the one or more servers is not more than the total power limit.

27. The apparatus of claim 25, wherein the probability distribution of the power demand is estimated based on a Bayesian Theorem.

28. The apparatus of claim 27, wherein the Bayesian Theorem is based on a demand bigram model and a power capping model.

29. The apparatus of claim of claim 25, wherein the estimated performance loss is based on:

a previous power demand of each of the one or more servers; and power consumption of each of the one or more servers when any of the servers executes a throttle, wherein the throttle is executed when the power demand of any of the one or more servers exceeds a predetermined power level threshold.

30. The apparatus of claim 25, wherein computing the power capping limits is based on a hill-climbing method, wherein measuring the power consumption is performed by a power controller of each of the one or more servers, and wherein dynamically allocating the power capping limits to each of the one or more servers comprises modifying previous power capping limits of each of the one or more servers via power controller units of the servers.

* * * * *